Patented Dec. 20, 1927.

1,653,088

UNITED STATES PATENT OFFICE.

TOMAS DE LA CONCHA, OF NEW YORK, N. Y., ASSIGNOR OF ONE-HALF TO PERCY A. HUGHES, OF LONDON, ENGLAND.

COMPOSITION OF MATTER.

No Drawing. Application filed October 27, 1926. Serial No. 144,651.

This invention relates to a composition of matter adaptable as a solder for uniting metals. As the description proceeds, it will be evident that while the composition is an efficient solder for joining any similar article or similar metals, this specification will describe it in connection with the uniting of aluminum pieces.

The difficulties involved in the uniting or joining together of aluminum alloys or aluminum with other metals in such a way that there is obtained a non-corrosive joint have long been recognized, and many attempts have been made to provide a solder, which would stand the test of use, and while many claims have been made for more or less known compositions of aluminium solders, it is well known to-day, that full development of aluminum in more avenues of public use is checked by the lack of a solder or uniting agent which is noncorrosive and after the joint is effected will stand the test of time.

The object of this invention is to provide a composition of matter for soldering and welding aluminum which may be easily and quickly applied to the surface to be soldered or welded, and to form a weld of great strength and durability.

A further object of the invention is to provide a method of soldering and welding aluminum which shall be simple and easily practiced, without requiring a high degree of skill on the part of the operator. To the above ends the invention consists in the composition of matter and the method hereinafter described and more particularly defined in the claims.

The composition of matter comprises lead, tin, zinc, aluminum and German silver. These materials are all melted or fused together, thoroughly mixed and then cast in the form of a stick. The preferred proportions of the composition are lead 30%, tin 50%, zinc 12%, aluminum 5% and German silver 3%. The proportions of the German silver used in my solder is copper 54 parts, zinc 28 parts and nickel 18 parts.

The method of preparing the composition is as follows:

Lead is placed into a crucible and when melted, the tin is added. When these two metals are melted together a piece of sulphur is dropped into the crucible. When the sulphur has completely volatilized the other metals in the order named are added and finally cast in suitable sticks.

For a mix of about 50 pounds a piece of sulphur as large as a Brazil nut is sufficient. No flux is necessary for the application of the solder. In applying this composition of matter the surfaces are first cleaned and then heated with a blow pipe or blow torch and when well heated, the stick of the composition is applied directly to the parts to be joined, and the melted solder will run readily between the adjacent parts. The solder works its way through the line of contact of the two pieces of metal and quickly effects the union thereof. The united pieces may then be cooled and cleaned immediately leaving a clear joint. This joint is usually harder and stronger than the joined pieces themselves and will not corrode or disintegrate.

On small work as in sheet alumnium, the soldering can be done with a standard soldering iron.

Having thus described my invention, what I desire to secure by United States Letters Patent is:

A composition of matter comprising lead, tin, zinc, aluminum and German silver in approximately the following proportions: 30% lead, 50% tin, 12% zinc, 5% aluminum and 3% German silver.

In testimony whereof I affix my signature.

TOMAS DE LA CONCHA.